Feb. 15, 1944. G. R. CUNNINGTON 2,341,979
DECORATION
Filed Nov. 6, 1941
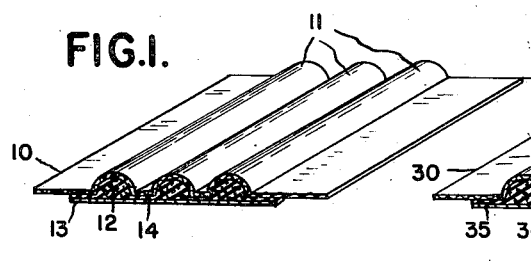
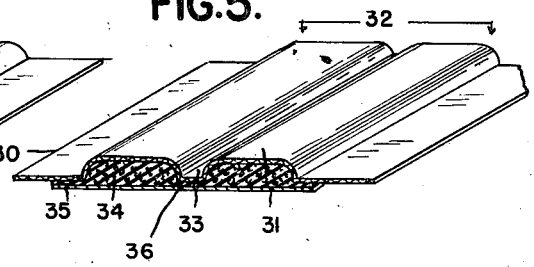
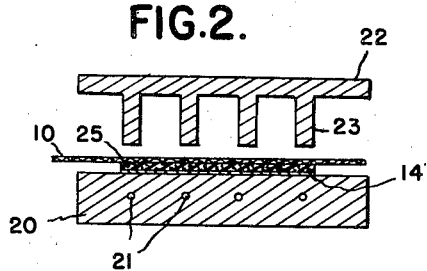
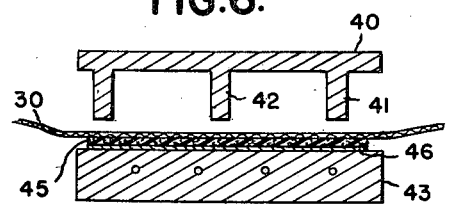
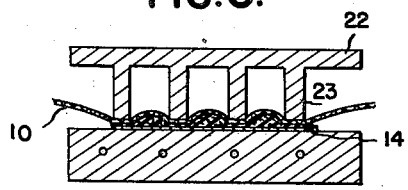
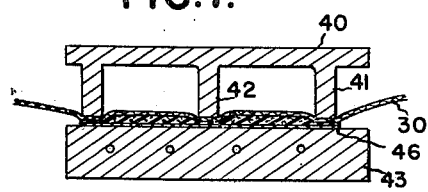
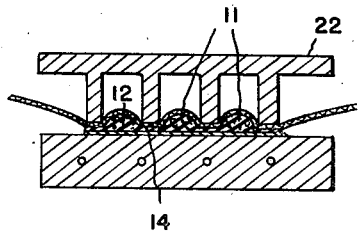
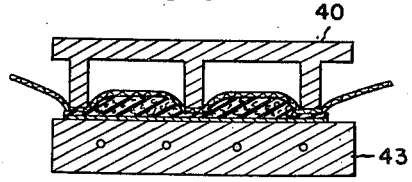
INVENTOR.
GEORGE R. CUNNINGTON
BY Whittemore, Hulbert
& Belknap
ATTORNEYS Patented Feb. 15, 1944

2,341,979

UNITED STATES PATENT OFFICE 2,341,979

DECORATION

George R. Cunnington, Grosse Pointe Park, Mich., assignor to National Automotive Fibres, Inc., Detroit, Mich., a corporation of Delaware Application November 6, 1941, Serial No. 418,103

11 Claims. (Cl. 154—2)

The present invention relates to fabric decorated by having a raised or relief design therein.

According to the present invention a fabric is provided with a relief design which is permanently retained in the fabric by risers of sponge rubber located beneath or at the rear of raised elements of the design, the risers being permanently attached to the fabric. Preferably a reinforcing sheeting is attached to the rear surface of the rubber.

The fabric is provided with this form of decoration by the practice of a method which includes the steps of placing a ply of uncured, thermally expansive, soft rubber stock at the rear of the fabric to be decorated; applying pressure to certain areas of the fabric overlying the rubber stock, these areas corresponding to the desired depressed portions of the design, so as to displace substantially all of the rubber from beneath said areas, while leaving the intervening areas of the fabric free for outward displacement; thereafter subjecting the rubber stock to heat sufficient to expand the rubber stock underneath the said areas of said fabric intermediate the said areas of pressure application, while continuing the application of pressure, and to vulcanize all of said rubber stock; whereby the rubber stock remaining beneath the areas of pressure application is prevented by said pressure from expanding and becomes vulcanized in dense form to the rear face of said fabric, and the rubber stock intermediate the areas of pressure application expands and becomes vulcanized to form relatively high, soft risers which retain the elevated elements of the design in raised position. Preferably a reinforcing sheeting is provided which is secured to the rear surface of the rubber. The pressure referred to is conveniently applied by means of a die having die elements corresponding to the desired low portions of the design, the spaces between the die elements being of sufficient depth so that the outward movement of the fabric into the raised elements of the design, which occurs by reason of the displacement of rubber stock and by the subsequent expansion of the rubber stock, is freely permitted. Preferably also the die elements have flat bottoms of substantial width. Conveniently the heat necessary to expand and to vulcanize the rubber stock is applied from a flat platen on which the fabric and rubber assembly is placed just prior to moving the die thereagainst. The application of pressure takes place immediately, so that no substantial transfer of heat to the rubber occurs before the initial shaping operation.

With the foregoing general description in mind, it is an object of the present invention to provide a novel decorated fabric of the type described. It is a further object of the present invention to produce the decorated fabric by the method disclosed.

More specifically, the present invention has as its object the decoration of fabric by first forming unvulcanized blowing rubber stock into riser portions by applying pressure thereto through a fabric, and thereafter expanding and vulcanizing said riser portions while maintaining pressure to vulcanize said rubber to said fabric.

Other objects of the invention will be apparent as the description proceeds, and when taken in conjunction with the accompanying drawing.

Figure 1 is a fragmentary perspective, partly in section, of a fabric decorated in accordance with the present invention;

Figures 2, 3 and 4 are sectional views through the die illustrating the steps in the manufacture of my improved decorative fabric;

Figure 5 is a fragmentary perspective, partly in section, showing a slightly different form of decorated fabric; and Figures 6 to 8 are sectional views through the die illustrating the steps in the manufacture of said form of fabric shown in Figure 5.

Referring first to Figure 1, I have shown a portion of a decorated fabric 10, the decoration being in the form of raised beads or ridges 11. As shown in this figure, three such beads or ridges are provided and these are straight, parallel beads. However, the raised decoration may take the form of any design and the form shown in Figure 1 is merely a simple design chosen for purposes of illustration. The fabric is retained in raised position in the beads by reason of riser portions 12, which are formed of a soft, vulcanized sponge rubber. Preferably the decoration provided in the fabric 10 is reinforced by means of a reinforcing sheeting 13, which may be paper, a woven fabric, or the like. As a result of the method of manufacture which will later be described, the fabric 10 is provided with a substantially direct vulcanized bond to the reinforcing sheeting 13, at low portions in the design, as indicated at 14, and this bond is provided by substantially dense, unexpanded rubber. It will be appreciated that this design may be applied to a portion of a large piece of fabric, and when so applied does not substantially reduce the flexibility of the fabric for the reason that the rubber which forms the riser elements is itself highly flexible. In other cases the reinforcing sheeting 13 may be in the form of a rigid material, as for example cardboard.

Referring now to Figures 2 to 4, I have shown sequential steps in the manufacture of my improved decorated fabric. In these figures a lower supporting platen 20 is shown which has an upper plane surface. Preferably the heat which is used to expand and vulcanize the rubber is supplied from this platen, and for this purpose I have indicated openings 21, which may be steam passages or, if preferred, electrical or other types of heating elements may be provided in platen 20.

Over the platen 20 are dies 22 having depending die elements 23 whose arrangement corresponds to the low portions of the design to be imparted to the fabric. The die elements 23 are preferably flat bottomed and of substantial width, for purposes which will later appear. These die elements 23 are also relatively deep so as to provide ample space therebetween for the movement of the fabric under the forming operation.

As seen in Figure 2, the fabric 10 to be decorated is assembled with a sheet of unvulcanized blowing rubber stock 25, which preferably has the backing or reinforcing sheet 13 carried at its rear surface. The die 22 and platen 20 are relatively movable so that a space is provided therebetween for the insertion of the assembly made up of the fabric 10, rubber stock 25 and sheeting 13.

The rubber stock 25 which is employed is a good grade rubber compounded with blowing agents so that upon the application of heat the rubber expands and when vulcanized becomes a soft, vulcanized sponge rubber. Suitable rubber stocks for this purpose are familiar, and no particular compound need be employed, except that it is preferable, for reasons of economy, to employ a quick curing stock.

The assembly is placed on the platen and immediately thereafter the die 22 is moved downwardly to the position shown in Figure 3. The downward movement of the die 22 takes place before there has been any substantial transfer of heat to the rubber stock 25 so that the rubber does not begin to blow or expand until the die 22 has moved downwardly. Rubber stocks of this type require a substantial interval of heat application before blowing takes place.

When the die 22 is moved downwardly, the die elements 23 apply pressure to the fabric 10 and the pressure applied to the rubber stock 25 through the fabric 10 displaces the major portion of such rubber stock from beneath the die elements 23 into the spaces between the die elements 23. This provides an additional amount of blowing rubber stock between the die elements, which upon blowing becomes the risers 12 illustrated in Figure 1. It is pointed out, however, that not all of the rubber stock is displaced from beneath the die elements 23, and instead a thin film of rubber stock remains between the fabric 10 and the sheeting 13 at this time.

Figure 4 illustrates the condition of the assembly after substantial heating and vulcanization. The fabric employed is preferably slightly extensible so that when the rubber stock formed into the riser portions beneath the die elements 23 is heated, it expands into the soft, porous sponge rubber risers 12, as seen in Figure 4. It will be appreciated, by comparing Figures 3 and 4, that the blowing or expansion of the rubber stock 25 substantially increases the height of the risers 12. This results in economy since risers of a given height may be produced with less rubber than would be employed if the rubber were not a blowing rubber stock. Furthermore, the blowing of the rubber into a soft, porous sponge rubber results in softer and more resilient risers, which is a very desirable feature.

The blowing or expansion of rubber stock of the type referred to is substantially restricted if pressure is applied and due to the continuous application of pressure by the die elements 23, the films or thin layers of rubber underlying the die elements 23 cannot expand to any substantial degree. Accordingly, this rubber becomes vulcanized in a dense form and provides a very strong bond between the fabric 10 and the sheeting 13. The final result of the practice of this method is the formation of the rubber stock 25 into a plurality of soft, porous, vulcanized sponge rubber risers 12, together with interconnecting thin films or sheets of dense rubber, as indicated at 14. While the sponge rubber which forms the riser 12 becomes vulcanized, it ordinarily does not become vulcanized strongly to the fabric 10, and the interconnection between the rubber and the fabric 10 is therefore largely restricted to the areas underlying the die elements 23. This is one reason why it is preferred to employ flat-bottomed die elements of substantial width.

In Figure 5 I have shown a decorated fabric 30, which is generally similar to that shown in Figure 1 but differs therefrom in that the beads 31 are substantially wider. The decorated fabric 30 may be considered as being provided with an elevated zone 32 which, in turn, is provided with a debossed decoration or groove 33. It will be appreciated that instead of providing a single debossed groove, any design may be provided. The fabric 30 is provided with this form of decoration in a manner substantially similar to that described in connection with Figure 1. The decorated zone 32 is provided by reason of vulcanized sponge rubber 34, at the rear of which is preferably provided a reinforcing sheeting 35 which may be paper, fabric or, if preferred, a stiff and rigid material such as cardboard. The rubber which forms the sponge rubber 34 is continuous beneath the debossed portions of the design, as indicated at 36, but in these locations is not in the form of sponge rubber, but instead is in the form of a thin film or ply of dense, vulcanized rubber which provides a strong vulcanized bond between the fabric 30 and the sheet 35.

Referring to Figures 6 to 8, the method of manufacture is identical, with the exception that the die 40 is provided with depending die elements which are spaced further apart. The die elements comprise outer die elements 41 which determine the boundary of the elevated decorated zone, and an intermdiate die element or elements 42 which may be shaped as desired to impart any desired debossed decoration to the elevated zone.

In providing the decoration the fabric 30 is assembled with a ply of uncured blowing rubber stock 45 which preferably has at its rear surface a reinforcing sheeting 46. This assembly is placed on the heated platen 43 and immediately, before any substantial interval of heat from the platen 43 to the rubber stock 45 has occurred, the die 40 is moved downwardly to the position shown in Figure 7. As seen in Figure 7, nearly but not quite all of the rubber stock 45 is displaced from beneath the die elements 41 and 42 into the space between the die elements. A thin film or ply of rubber stock remains beneath the die elements 41 and 42 and serves to provide a dense, vulcanized rubber bond between the fabric 30 and the sheeting 46. The die 40 is retained in the position shown in Figure 7 until the rubber assumes the shape shown in Figure 8. At this time the rubber stock which occupies the space between the die elements 41 and 42 expands as a result of heating into the porous, sponge form shown in this figure. The application of heat from the platen 43, and the application of pressure through the die 40 is continued until blowing of the rubber stock and vulcanization is substantially complete.

As a result of the pressure directly applied to the thin film of rubber directly beneath the die elements 41 and 42, no substantial sponging of the rubber takes place at this point, with the result that the fabric 30 is vulcanized substantially directly by means of dense, vulcanized rubber to the sheeting 46.

Attention is directed to the fact that in all cases an uncured blowing rubber stock is provided which is first initially shaped into riser portions by the application of pressure through the fabric to be decorated. Thereafter, while the application of pressure is continued, heat is supplied to the riser portions of the rubber stock so as to cause them to expand into porous sponge rubber and to become vulcanized.

While I prefer to employ the reinforcing sheeting 13 or 35, these need not be used. Where employed, they permit substantial tension of the decorated fabric in use without pulling out the design. When the fabric is not to be tensioned in use, this reinforcing sheeting need not be provided. However, the unvulcanized sponge rubber stock is conveniently provided in the form of rolls calendered to paper or other sheeting, and in all cases it will probably be more economical to permit this sheeting to remain than to remove the same.

While I have illustrated and described but two specific products and the method employed in their production, it will be understood that this has been done solely to enable those skilled in the art to practice the present invention, the scope of which is indicated by the appended claims.

What I claim as my invention is:

1. The method of imparting a relief design to a fabric which comprises: assembling a thin sheet of uncured, thermally expansive soft rubber between the rear of the fabric to be decorated and a reinforcing sheeting; positioning said assembly on a support with the fabric outermost, applying pressure to said fabric at a plurality of spaced areas which are to be low portions of said design to largely displace rubber from therebeneath into adjacent thickened riser portions while permitting free outward displacement of said fabric intermediate and adjacent said areas of pressure application by said displaced rubber, thereby confining said riser portions beneath the fabric and between said areas of pressure application, and thereafter heating said rubber to expand and vulcanize said rubber in displaced and expanded positions while maintaining the application of pressure.

2. The method of imparting a relief design to a fabric which comprises: assembling a thin sheet of uncured, thermally expansive, soft rubber between the rear of the fabric to be decorated and a reinforcing sheeting; positioning said assembly on a support with the fabric outermost; positioning a die having a plurality of spaced die elements adjacent said support, said die having deep recesses intermediate said elements; pressing said die toward said support to largely displace said rubber from beneath said die elements into riser portions therebetween, the deep recesses of said die permitting free outward displacement of said fabric intermediate said die elements by said rubber; and thereafter heating said rubber to expand said riser portions and to vulcanize said rubber while maintaining pressure on said die to prevent expansion of said rubber remaining beneath said die elements; thereby vulcanizing said fabric and sheeting substantially directly together by thin, dense rubber between said riser portions.

3. The method of imparting a relief design to a fabric which comprises: assembling a thin sheet of uncured, thermally expansive, soft rubber between the rear of the fabric to be decorated and a reinforcing sheeting; positioning said assembly on a heated support with the fabric outermost; applying pressure to said fabric at a plurality of spaced areas which are to be low portions of said design to largely displace rubber from therebeneath into adjacent thickened riser portions while permitting free outward displacement of said fabric intermediate and adjacent said areas of pressure application by said displaced rubber; and thereafter heating said rubber from said heated support to expand and vulcanize said riser portions in displaced and expanded positions while maintaining the application of pressure to prevent expansion of rubber remaining between said riser portions.

4. The method of providing a relief design in a fabric which comprises: assembling at the rear of said fabric an intermediate ply of uncured, thermally expansive rubber stock and a backing ply of substantially inextensible sheeting; supporting said assembly between a support and a deep die having a plurality of spaced flat-bottomed die elements; moving said die and support together in a manner to displace all but a thin film of rubber stock from beneath said die elements into riser portions intermediate said die elements; thereafter heating said rubber stock to expand and vulcanize said riser portions while retaining said die and support in position to prevent expansion of the said thin film of rubber stock beneath said die elements, said die being sufficiently deep to permit free expansion of the riser portions restricted only by the fabric; whereby said fabric is bonded by thin, dense rubber to said sheeting at low portions of said design throughout areas corresponding to the areas of said flat-bottomed die elements, and separated therefrom by risers of vulcanized expanded rubber at other points.

5. The method of imparting a relief design to a fabric which comprises: abutting a thin sheet of soft thermally expansive uncured rubber against the rear surface of said fabric; applying pressure to the face of said fabric along a plurality of spaced areas defining a desired design while leaving the face of said fabric between and adjacent said areas free for outward displacement, the pressure applied being sufficient to displace all but a thin film of said rubber into riser portions between and adjacent the said areas of pressure application; and thereafter supplying heat to said rubber to cause a thermal expansion of said riser portions while maintaining said pressure to prevent expansion of said rubber films beneath said areas of pressure application.

6. The method of imparting a relief design to a fabric which comprises: abutting a thin sheet of soft, thermally expansive, uncured rubber against the rear surface of said fabric; positioning said fabric and rubber between a support and an opposed die having a plurality of spaced die elements provided with substantially flat bottoms; relatively pressing said support and die together so as to cause said die elements to impinge said fabric within the edges of said rubber and to displace all but a film of rubber from beneath the flat bottoms of said die elements into riser portions in the spaces intermediate said die elements; and thereafter supplying heat to said rubber while continuing pressure between said die and support; whereby to thermally expand said riser portions, to prevent thermal expansion of said films of rubber, and to vulcanize all of said rubber.

7. An article of the class described comprising a fabric having a relief design provided with elevated and depressed portions, a continuous sheet of soft cured rubber at the rear of said fabric having riser portions of sponge rubber at the rear of the elevated portions of said design and having thin webs of relatively dense unsponged rubber at the rear of the depressed portions and interconnecting said risers and vulcanized to said fabric at the depressed portions of said design.

8. An article of the class described comprising a trim fabric having a relief design provided with elevated and depressed portions, a continuous vulcanized rubber layer at the rear of said fabric, said rubber layer having riser portions of soft expanded rubber filling the elevated portions of the relief design in said fabric and having intermediate portions of thin dense unexpanded rubber in rear of the depressed portions of said fabric, said rubber layer being vulcanized to said fabric to retain said relief design in said fabric, and a reinforcing, flexible sheeting secured to the rear surface of said rubber layer, whereby said fabric and said sheeting are bonded substantially directly together by the thin dense unexpanded rubber intermediate the riser portions of said layer.

9. An article of the class described comprising a trim fabric having a relief design provided with alternate elevated and depressed portions, a layer of vulcanized rubber on the underside of said fabric having alternate riser and compressed portions, the riser portions being soft porous sponged rubber and substantially filling and yieldably maintaining the elevated portions of the relief design in the fabric, the compressed portions being thin dense unsponged rubber interconnecting the riser portions and underlying and bonded in surface to surface relation to the depressed portions of the relief design in the fabric, and a flexible backing sheet underlying the riser portions and interconnecting compressed portions of the layer of vulcanized rubber and bonded to the compressed portions thereof.

10. An article of the class described comprising a trim fabric having a relief design provided with elevated and depressed portions, a layer of vulcanized rubber on the underside of said fabric having riser and compressed portions, the riser portions being soft sponged rubber and substantially filling and yieldably maintaining the elevated portions of the relief design in the fabric, the compressed portions being thin dense unsponged rubber underlying and bonded in surface to surface relation to the depressed portions of the relief design in the fabric, and a reinforcing sheet underlying the riser portions and compressed portions of the layer of vulcanized rubber and bonded to the compressed portions thereof.

11. The method of making a decorated fabric having a relief design provided with alternate elevated and depressed portions, comprising the steps of placing a layer of unvulcanized blowing rubber stock in rear of the fabric to be decorated, initially shaping the rubber stock by applying pressure to the fabric at certain areas which are to be the depressed portions of said design to displace from beneath such areas into intervening areas of the fabric which are to be the elevated portions of said design all but thin films of rubber, while leaving the intervening areas of the fabric free for outward displacement to form the elevated portions of said design, and finally shaping the rubber stock by subjecting it to heat while the pressure aforesaid is applied so that the thin films of rubber remaining beneath the areas of pressure application will be vulcanized in dense form to the depressed areas of said fabric being subjected to pressure and are prevented by said pressure from expanding, and the rubber including the displaced portions thereof intermediate the areas of pressure application will be blown and vulcanized into soft sponge risers to displace outwardly the outwardly displaceable intervening areas of the fabric to thereby form and yieldably maintain the elevated portions of the design.

GEORGE R. CUNNINGTON.